US012602707B1

(12) United States Patent
Bhow et al.

(10) Patent No.: US 12,602,707 B1
(45) Date of Patent: *Apr. 14, 2026

(54) MACHINE LEARNING SYSTEM FOR PERSONALLY OPTIMIZED OFFER DECAY CURVES

(71) Applicant: WALGREEN CO., Deerfield, IL (US)

(72) Inventors: Gunjan Dhanesh Bhow, Menlo Park, CA (US); Ajumobi O. Udechukwu, Lake Forest, IL (US); Ryan M. Snedden, Chicago, IL (US); Brian C. Tyrrell, Western Springs, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,768

(22) Filed: Aug. 7, 2024

Related U.S. Application Data

(63) Continuation of application No. 18/128,637, filed on Mar. 30, 2023, now Pat. No. 12,079,833, which is a
(Continued)

(51) Int. Cl.
G06Q 30/0207 (2023.01)
G06N 5/04 (2023.01)
(Continued)

(52) U.S. Cl.
CPC .......... G06Q 30/0224 (2013.01); G06N 5/04 (2013.01); G06N 20/00 (2019.01); G06Q 30/0235 (2013.01)

(58) Field of Classification Search
None
See application file for complete search history.

(56) References Cited

U.S. PATENT DOCUMENTS 7,533,038 B2 5/2009 Blume et al.
8,001,044 B2 8/2011 Davis
(Continued)

OTHER PUBLICATIONS

Placide et al. Information Decay in Building Predictive Models Using Temporal Data, Third International Symposium on Information Science and Engineering, 2010 IEEE, IEEE Computer Society.*

(Continued)

*Primary Examiner* — David J Stoltenberg
(74) *Attorney, Agent, or Firm* — MARSHALL, GERSTEIN & BORUN LLP; Randall G. Rueth

(57) ABSTRACT

An offer decay generation model determines, for a particular customer, a personalized optimal offer decay curve of an incentive corresponding to a product provided by an enterprise, where the offer decay curve defines a set of decreasing incentive values and respective time intervals during which each incentive value is valid. The offer decay generation model is trained on historical data indicative of customers, customer interactions, offered incentives, resulting outcomes of the incentives, and time intervals elapsing between incentives and resulting outcomes. As such, the optimized offer decay curve is structured to maximize a probability that the particular customer is motivated to accept the incentive offer, purchase a product, and/or further interact with the enterprise during the lifetime of the offer decay curve. The offer decay curve may unique to the individual customer, and may be further customized based on other parameters such as location, time/day/date, inventories, etc.

20 Claims, 4 Drawing Sheets

Related U.S. Application Data continuation of application No. 17/150,833, filed on Jan. 15, 2021, now Pat. No. 11,676,169.

(51) Int. Cl.
G06N 20/00 (2019.01)
G06Q 30/0235 (2023.01)

(56) References Cited

U.S. PATENT DOCUMENTS

| | | | |
|---|---|---|---|
| 9,384,493 B2 | 7/2016 | Harris et al. | |
| 10,275,784 B2 | 4/2019 | Thomas et al. | |
| 2009/0061884 A1 | 3/2009 | Rajan et al. | |
| 2012/0166268 A1 | 6/2012 | Griffiths | |
| 2012/0296716 A1* | 11/2012 | Barbeau | G06Q 30/02 |
| | | | 705/14.1 |
| 2013/0144696 A1 | 6/2013 | Raisch | |
| 2013/0268356 A1* | 10/2013 | Quatse | G06Q 30/0254 |
| | | | 705/14.52 |
| 2014/0081753 A1 | 3/2014 | Mesaros | |
| 2014/0365314 A1 | 12/2014 | Torrens et al. | |
| 2017/0068984 A1 | 3/2017 | Joshi et al. | |
| 2017/0076311 A1 | 3/2017 | Rajan et al. | |
| 2017/0372329 A1 | 12/2017 | Edwards | |
| 2018/0158092 A1* | 6/2018 | Castinado | G06Q 40/02 |
| 2019/0012718 A1 | 1/2019 | Vadlamudi et al. | |
| 2019/0333078 A1* | 10/2019 | Bala | G06Q 40/06 |
| 2020/0234326 A1 | 7/2020 | Lagerling | |
| 2020/0250605 A1 | 8/2020 | Moorthy et al. | |
| 2020/0294094 A1 | 9/2020 | Brock et al. | |
| 2021/0365973 A1 | 11/2021 | Guild et al. | |
| 2021/0406937 A1 | 12/2021 | Oh et al. | |

OTHER PUBLICATIONS

Ban et al., Personalized Dynamic Pricing with Machine Learning: High Dimensional Features and Heterogeneous Elasticity, Forthcoming, Management Science, (2020).

Chen et al., A Primal-dual Learning Algorithm for Personalized Dynamic Pricing with an Inventory Constraint, arXiv e-prints, arXiv:1812.09234, (2018).

Elmaghraby et al., Dynamic Pricing in the Presence of Inventory Considerations: Research Overview, Current Practices, and Future Directions, Management Science, (2003).

Farias et al., Dynamic Pricing with a Prior on Market Response, Operations Research, (2009).

Gallego et al,. Optimal Dynamic Pricing of Inventories with Stochastic Demand over Finite Horizons, Management Science, (1994).

Sato et al., Discount Sensitive Recommender System for Retail Business, EMPIRE, (2015).

Savas et al., "On the complexity of sequential incentive design", arXiv:2007.08548v1 [math.OC] Jul. 16, 2020.

Towards Data Science, "Starbucks Offer Personalization—Sending the right offer to the right customer". Retrieved from the Internet at: <URL: https://towardsdatascience.com/starbucks-offer-personalization-sending-the-right-offer-to-the-right-customer-14d4fbc20575> (2019).

Zhao et al., E-commerce Recommendation with Personalized Promotion, RecSys, (2015).

Offer Personalization using Temporal Convolution Network and Optimization, Ankur Verma, arXiv:2010.08130v1 [cs.LG] Oct. 14, 2020.

* cited by examiner

Figure 3:
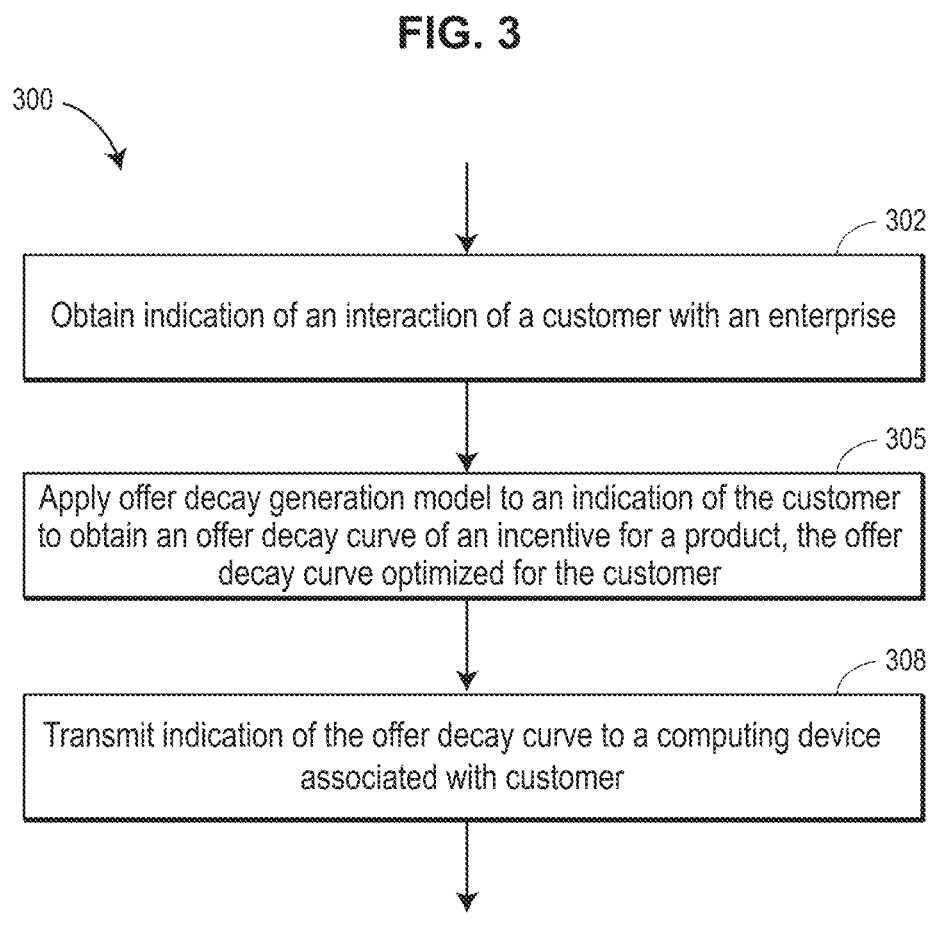

Obtain indication of an interaction of a customer with an enterprise

305

Apply offer decay generation model to an indication of the customer to obtain an offer decay curve of an incentive for a product, the offer decay curve optimized for the customer

308

Transmit indication of the offer decay curve to a computing device associated with customer

FIG. 4

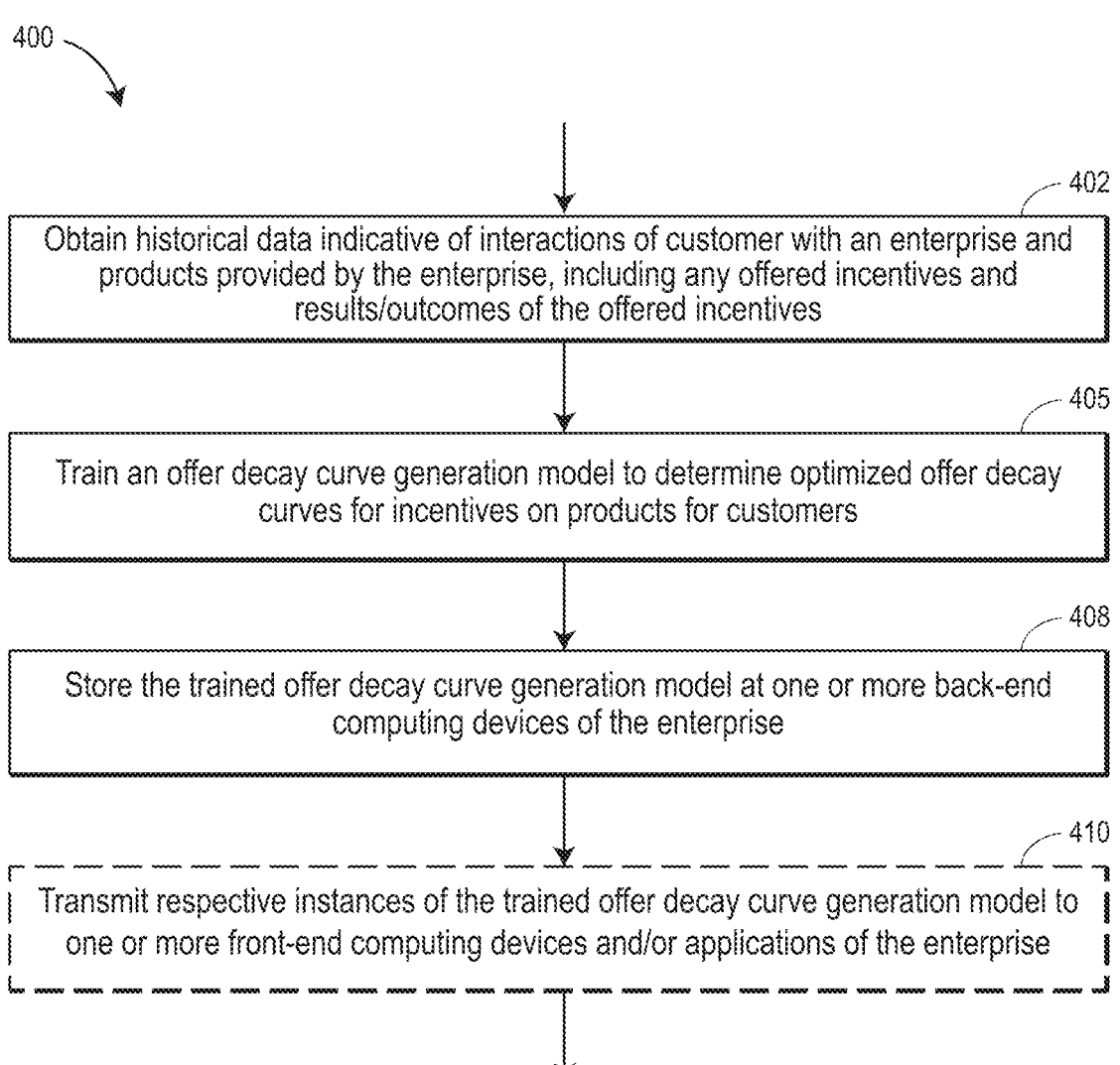

400

402
Obtain historical data indicative of interactions of customer with an enterprise and products provided by the enterprise, including any offered incentives and results/outcomes of the offered incentives 405
Train an offer decay curve generation model to determine optimized offer decay curves for incentives on products for customers 408
Store the trained offer decay curve generation model at one or more back-end computing devices of the enterprise 410
Transmit respective instances of the trained offer decay curve generation model to one or more front-end computing devices and/or applications of the enterprise

MACHINE LEARNING SYSTEM FOR PERSONALLY OPTIMIZED OFFER DECAY CURVES

CROSS-REFERENCE TO RELATED APPLICATIONS

This application is a continuation of U.S. patent application Ser. No. 18/128,637 entitled "Machine Learning System for Personally Optimized Offer Decay Curves" and filed on Mar. 30, 2023, which is a continuation of U.S. patent application Ser. No. 17/150,833 entitled "Machine Learning System for Personally Optimized Offer Decay Curves," filed on Jan. 15, 2021, and issued as U.S. Pat. No. 11,676,169, the disclosures of which are hereby incorporated by reference herein in their entireties.

TECHNICAL FIELD

This application generally relates to a machine learning system for personalizing or customizing or personalizing, for an individual person, offer decay curves corresponding to products.

BACKGROUND

Retailers commonly offer sales, coupons, and/or rebates to incentivize or motivate customers to purchase various products. Typically, such incentives are based on business conditions, and may be particularly related to seasonality. For example, retailers may offer discounts on school supplies and backpacks in the summer months before schools return to session, retailers may offer discount on candy and costumes prior to the Halloween holiday, etc., with discount values generally increasing as the season ends or the holiday date draws near.

Many of these discounts, coupons, and other similar types of incentives, though, are based on types and/or characteristics of customers at an aggregate level (e.g., age, gender, education level, address, etc.) and are not specific to individual customers. Additionally, these types of incentives typically have a fixed incentive value. As such, such broad-brushed incentives may not motivate a customer to make a purchase, and thus the customer may ignore the incentive or give the incentive away to another person to use (e.g., coupon sharing). Significantly, many of these discounts, coupons, and other typical incentives do not result in corresponding customer purchases, thus leaving retailers with excess inventory and wasted resources.

SUMMARY

In an embodiment, a method includes obtaining, at one or more computing devices associated with an enterprise, an electronic signal indicative of an interaction of a customer with the enterprise and, based on the interaction of the customer with the enterprise, applying an offer decay generation model to an indication of the customer to obtain an offer decay curve for an incentive corresponding to a product provided by the enterprise, where the offer decay curve is optimized for the customer. The offer decay generation model is a machine learning model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize the probabilities of the individual customers purchasing products; and the offer decay curve which is optimized for the customer indicates an ordered set of decreasing values of the incentive, where each value of the ordered set of decreasing values corresponds to a respective subsequent time interval during which the each value is valid. Additionally, the method includes transmitting the offer decay curve to a computing device associated with the customer.

In an embodiment, a system includes a network interface via which an electronic signal indicative of an interaction of a customer with an enterprise is received, and an offer decay generation model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize the probabilities of the individual customers purchasing products. The system further includes an offer decay curve generator component configured to apply the offer decay generation model to an indication of the customer to generate an offer decay curve optimized for the customer, where the offer decay curve indicates an ordered set of decreasing values of an incentive corresponding to a product provided by the enterprise, and each value of the ordered set of decreasing values corresponds to a respective subsequent time interval during which the each value is valid.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts a flow chart of an example method for generating an optimized offer decay curve that is particularly personalized or customized for a particular user or customer of the enterprise.

FIG. 4 illustrates a flow chart of an example method for creating or generating an offer decay curve generation model, which may be utilized in the system of FIG. 1.

DETAILED DESCRIPTION

Figure 1:
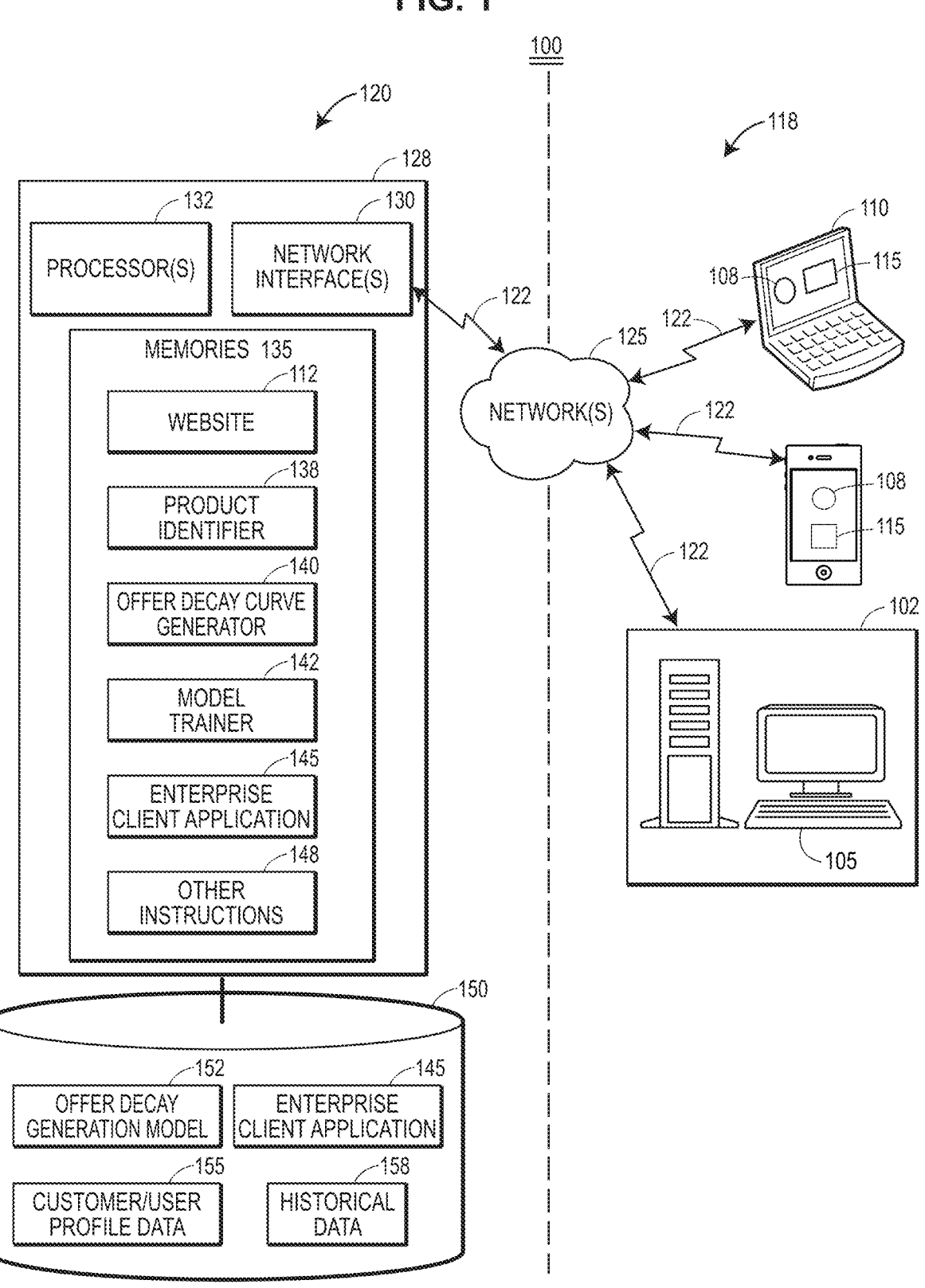
FIG. 1 depicts a block diagram of an example system of an enterprise for generating offer decay curves for products provided by the enterprise, where each offer decay curve is optimized for a respective customer.

FIG. 1 illustrates a system 100 for generating, on an individual customer basis, customized optimal offer decay curves corresponding to products provided by an enterprise. The system 100 may be a machine learning (ML) system, for example. As utilized herein, the term "product" generally refers to as an item or a service which is provided by an enterprise. Typically, a product may be listed (or otherwise indicated) by the enterprise as being available to customers at a particular price; however, in some scenarios, a product may be indicated by the enterprise as being free to customers. The term "offer," as utilized herein, generally refers to an incentive, offered to a customer, to purchase a product provided by an enterprise. For example, an incentive may include a discount on an indicated or listed price of a product, a free or discounted second product with the purchase of a first product, an increase in a rewards or loyalty account of a customer with the enterprise upon the purchase of a product, an offer of a different and/or additional incentive which is to be awarded to a customer upon completion of a specified customer action or interaction (e.g., providing an email address, providing a review, posting on social media, answering a survey, etc.), and/or any other suitable incentives designed to motivate a customer to purchase a product and/or continue interacting or engaging with the enterprise.

A value of an offered incentive may decay over time; that is, after each subsequent time interval during which a present incentive value is valid, the value of the incentive may again decrease by some respective amount. The ordered set of decreasing values of the incentive and the time intervals elapsing therebetween (during which the respective values are valid) is referred to generally herein as an "offer decay curve," e.g., as the incentive value provided by the offer decays over time. As an example, an offer decay curve may include an initial incentive value of "60% off of a widget" where the 60% discount is valid for the next 10 minutes, after which the incentive value decreases to "40% off of the widget" where the 40% discount is valid for a subsequent 15 minutes, after which the incentive value decreases to "25% off of the widget" where the 25% discount is valid for a subsequent 30 minutes, after which the incentive value decreases to "10% off of the widget," where the 10% off is valid for the next week. The particular set of decreasing incentive values and the particular lengths of the respective time intervals during which each incentive value is valid as defined by the offer decay curve may be customized particularly (and in some cases, uniquely) for a customer, and the customer may be informed of the offer decay curve of the incentive when the incentive is initially offered to the customer. As such, the customized structure and contents of the offer decay curve generate a sense of urgency for the customer to accept the incentive offer, preferably earlier in the curve when the incentive value is of the most benefit to the customer.

The system 100 may include a combination of hardware, firmware, and software components, as well as various data communication channels for communicating data between and among the various hardware, firmware, and software components. The machine learning system 100 may be owned and/or operated by an enterprise or organization, such as a pharmacy or other type other type of retailer. Generally, but not necessarily, the enterprise may include one or more physical storefronts or physical storefront locations 102 at which one or more local or front-end computing devices 105 are disposed. Examples of physical storefronts of the enterprise may include bricks-and-mortar stores, retail operations hosted within other buildings (such as hospitals, university buildings, shopping malls, airports, etc.), pop-up stores or locations, and the like, each of which may have a respective mailing (e.g., postal) address. Additionally or alternatively, the enterprise may include one or more electronic storefronts or electronic storefront locations, such as instances 108 of client applications provided by the enterprise to execute at various user person electronic devices (PEDs) 110, and/or a website 112 that is accessible to the user electronic devices 110, e.g., via one or more web browsers 115, each of which may have one or more respective electronic addresses (such as website address, IP address, etc.). For example, a user of a PED 110 may access and navigate the enterprise website 112 via a browser 115 executing at the PED 110, and/or via an instance 108 of an enterprise-provided application which has been downloaded to and is executing on the PED 110.

The personal electronic device or PED 110 operated by the user may be, for example, a personal computer, a cellular phone, a smart device, a mobile communications device, a tablet, a laptop, another type of handheld electronic device, a desktop computer, etc. For ease of discussion, the PED 110 is referred to interchangeably herein as a "mobile device 110" or a "client device 110," however, the techniques are equally applicable to any type of PED 110 operated by a user irrespective of whether or not the PED 110 is mobile or stationary. It is noted that, in some implementations, an enterprise may choose to apply the systems, methods, and techniques described herein to only certain types of PEDs 110 (e.g., to only mobile devices and not stationary devices; only to only smart devices and smart phones but not tablets or laptops, etc.). However, these types of implementations are at the discretion of the enterprise as, generally speaking, the systems, methods, and techniques disclosed herein are equally applicable to any type of PED 110.

The local computing devices 105 of the system 100, the website 112 accessed via browsers 115 at the PEDs 110, and the instances 108 of enterprise client applications executing at PEDs 110 are collectively referred to herein as "front-end components 118" of the ML system 100. The ML system 100 may also include a set of back-end components 120. Communicative connections or links 122 between the front-end components 118 and the back-end components 120 may be established through one or more digital data and/or communications networks 125. The digital network(s) 125 may include a proprietary network, a secure public Internet, a virtual private network, and/or some other type of network, such as dedicated access lines, plain ordinary telephone lines, satellite links, wireless links, wired links, combinations of these, etc. Where the digital network 125 comprises the Internet or other IP-based communication network, data communication may take place over the digital network 120 via a protocol of the Internet protocol suite (e.g., TCP/IP, UDP, SCTP, various application layer protocols, etc.). Generally speaking, the communicative connections or links 122 which are established between the front-end components 118 and the back-end components 120 may be implemented by using any known communication technique, such as by establishing sessions therebetween, tunneling, circuit-switching, virtual circuit switching, etc.

The back-end components 120 may include one or more servers or computing devices 128, which are interchangeably referred to herein as "the back-end servers 128," "the back-end computing devices 128," or the "back-end server system 128." The one or more back-end computing devices 128 may be implemented, for example, by a bank of servers, a cloud computing system, one or more networked computing devices, or any other suitable arrangement of one or more computing devices. The back-end computing devices 128 may include one or more network interfaces 130 that communicatively connect the back-end computing devices 128 to the network(s) 125, the local computing devices 105 of the physical storefronts 102, and the PEDs 110. Additionally, the back-end computing devices 128 may include one or more processors 132 and one or more tangible, non-transitory memories 135 on which the website 112 and the other programs, applications, instructions, and/or routines 138-148 pertaining to the enterprise are stored. For example, the one or more memories 135 may store a product identifier module or component 138, an offer decay curve generator module or component 140, a model training module or component 142, and/or other modules, components, programs, applications, etc. 148, each of which comprises respective computer-executable instructions that are executable by the one or more processors 132. For example, at least one device of the back-end computing devices 128 may store instructions 148 for hosting the website 112 of the enterprise. In some embodiments, the one or more memories 135 may store an enterprise client application 145, instances 108 of which may be downloaded into user PEDs 110 for execution thereon. It is noted that in some embodiments of the system 100, the product identifier module 138 may be omitted.

Additionally, the back-end computing devices 128 may include and/or may be communicatively connected to one or more data stores 150, where the one or more data stores 150 comprise one or more tangible, non-transitory data storage devices which are particularly adapted to store data related to the operations of the ML system 100. It should be appreciated that although the data stores 150 are shown in FIG. 1 as a single data storage entity, the data stores 150 may be implemented using one or more databases and/or one or more data storage devices. For example, the data stores 150 may be implemented by a data bank or a data cloud. It should be noted that, while not shown, additional databases and/or data stores may be linked to the one or more back-end servers 128 in a known manner.

The data stores 150 may store an offer decay generation model 152, which may be utilized by the system 100 to generate customized or personalized offer decay curves for individual users or customers, such as is described in more detail elsewhere within this disclosure. In some implementations, the data stores 150 may store the enterprise client application 145, of which instances 108 may be downloaded into various user PEDs 110 for execution thereon.

Further, the data stores 150 may store customer or user profile data 155. The customer or user profile data 150 may include a plurality of profiles of a plurality of users associated with the enterprise, e.g., customers, clients, registered users, etc. Each user profile may be associated with a particular individual user or customer, and may be uniquely identified within the system 100 by a respective enterprise user identifier. For example, an enterprise user identifier may comprise a set of alphanumeric and/or other types of characters that are assigned by the enterprise to uniquely identify a particular user to the enterprise, whether at the website or in other databases and/or locations operated by the enterprise. Each user profile may store data corresponding to its respective user, such as his or her login credentials (e.g., user login name, password, passphrase, passcode, answers to security questions, biometric data, etc.), contact information (e.g., address, phone numbers, email addresses, etc.), account information, user preferences, purchase history, return history, claim history, stored payment options, prescriptions that have been ordered and filled, rewards and/or loyalty account data, offered incentives, outcomes of offered incentives, and/or other similar information indicative of transactions and/or interactions between the respective user and the enterprise (e.g., interactions that have taken place via the enterprise website 112, via instances 108 of the enterprise application 145, via in-person visits to storefront locations 102 as indicated by local storefront computing devices 105, via email, via chat, etc.), and via other means. Generally speaking, each user profile corresponds to a respective user account with the enterprise.

Still further, the data stores 150 may store historical data 158 related to the enterprise. The historical data 158 may include historical data indicative of various aspects and/or characteristics of a plurality of interactions of a plurality of customers with the enterprise, products provided by the enterprise, incentives offered by the enterprise, and results or outcomes of the offered incentives, among other types of historical data. Generally speaking, as utilized herein, a "customer interaction" is an action taken by a customer to interact and/or engage with the enterprise in some manner, such as accessing the enterprise website 112, opening an instance 108 of the enterprise client application 145, navigating to various portions of the website 112 and/or the application instance 108, sending an email or chat, scanning an item at an in-store kiosk, purchasing an item, etc. As such, types of data included in the historical data 158 may include historical data indicative of and associated with customer interactions with the enterprise, for example, customer identities, customer characteristics, types of interactions, locations of interactions, times/days/dates on which the interactions occurred, contents of interactions, product(s) associated with interactions, incentives which are offered to the customer for various products, changes in values of offered incentives and the times at which the changes were offered, respective results or outcomes of various offers/incentives and/or changes thereto over time (e.g., purchase of an item corresponding to the interaction at a respective price, purchase of another item at respective price, whether or not any incentives were utilized, saved item, no items purchased, etc.), and the like.

Additionally or alternatively, types of data included in the historical data 158 may include historical data indicative of and associated with products provided by the enterprise, for example, product identifiers, product list prices, product sell-through prices, product profit margins, revenue generated from the sale of products, inventories and decays of inventories of products at various enterprise locations, changes in list prices of products over time, incentives that were offered with respect to certain products and resulting outcomes (e.g., incentive ignored, incentive value increased, customer accepted offer and utilized incentive to make a purchase, etc.), related products, times/days/dates corresponding to collected product data, etc. Still additionally or alternatively, types of data included in the historical data 158 may include historical data indicative of and associated with enterprise locations, such as products offered, inventories, decays of inventories over time, location sell-through, location generated revenue, location profit margin, promotions and other incentives offered at the locations, times/days/dates corresponding to collected location data, etc.

Further, the types of data included in the historical data 158 may include historical data indicative of different types of incentives for different products, different values of the different incentives, different time-to-lives (TTLs) of the different incentives, different offer curves (both in values and/or in intermediate time intervals) for different products (which may include offer decay curves and/or offer increase curves), and resulting outcomes of various combinations of the same (e.g., incentive resulted in a sale of a product at a respective price within a respective time interval using a first offer decay curve, incentive resulted in a sale of the product at another respective price within another respective time interval using a second offer decay curve, the incentive resulted in a sale of an additional product, incentive and corresponding offer decay curve did not result in any sale, etc.). Types of data included in the historical data 158 may also include historical maximum sell-through data and/or historical maximal revenue data of various enterprise locations for various conditions, such as dates, products, seasons, promotions, prices, incentives, and the like. Of course, other historical data that is indicative of and associated with customers, customer interactions or engagements with the enterprise, products provided by the enterprise, location performance, and incentives may be included in the historical data 158.

The back-end computing devices or servers 128 may access the data stored in the data stores 150 when executing various functions and tasks associated with the operation of the ML system 100. For example, the back-end servers 128 may access the offer decay generation model 152 and the user profile data 155 to generate a customized or personalized offer decay curve for an individual customer with respect to a particular product, e.g., in manners such as described elsewhere within this disclosure. The back-end servers 128 may maintain and update various data stored in the data stores 150. For example, the back-end servers 128 may place orders, update passwords, user preferences, and default payment methods for various users within the user profile data 150, etc. (e.g., as indicated by various front-end components 108), and/or the back-end servers 128 may update the historical data 158 to include data indicative of various user interactions and/or transactions with the enterprise which have occurred (e.g., as indicated by various front-end components 118). In another example, the back-end servers 128 may create and/or update the offer decay generation model 152, e.g., by utilizing the historical data 158 and/or updates to the historical data 158, as is discussed in more detail elsewhere within this disclosure.

As previously mentioned, the one or more memories 135 of the back-end servers 128 may contain or be configured with machine- or computer-readable or computer-executable instructions or modules (e.g., software) 138-148 for execution by the one or more processors 132. For example, the sets of instructions 138-148 may be implemented as programs, applications, instructions, services, modules, routines, and the like, which may be executed by the one or more processors 132 to perform various tasks associated with generating customized or personalized offer decay curves, as well as to perform various tasks associated with operation of the enterprise. In an embodiment, some of the instructions 138-148 may comprise respective sets of computer-executable instructions which, when executed by the processor 132, cause the ML system 100 to execute at least a portion of embodiments of any of the methods described herein, such as the method 300 and/or the method 400. In some implementations, one or more of the sets of instructions 138-148 may operate in conjunction with one or more front-end components 118 (e.g., in conjunction with instances 108 of the client application 145, browsers 115 via which the website 112 is accessed, one or more local computing devices 105 disposed at physical storefronts 102, etc.) to perform various tasks associated with generating customized or personalized offer decay curves, to perform at least portions of one or more of the methods described herein, and/or to perform various tasks associated with the operations of the enterprise.

Still further, it will be appreciated that although only one computing device 128 is depicted in FIG. 1 as being included in the back-end components 120, multiple computing devices 128 may be provided for the purpose of distributing server load, serving different web pages, implementing different portions of an electronic web interface, servicing different enterprise client applications, etc.

Figure 2:
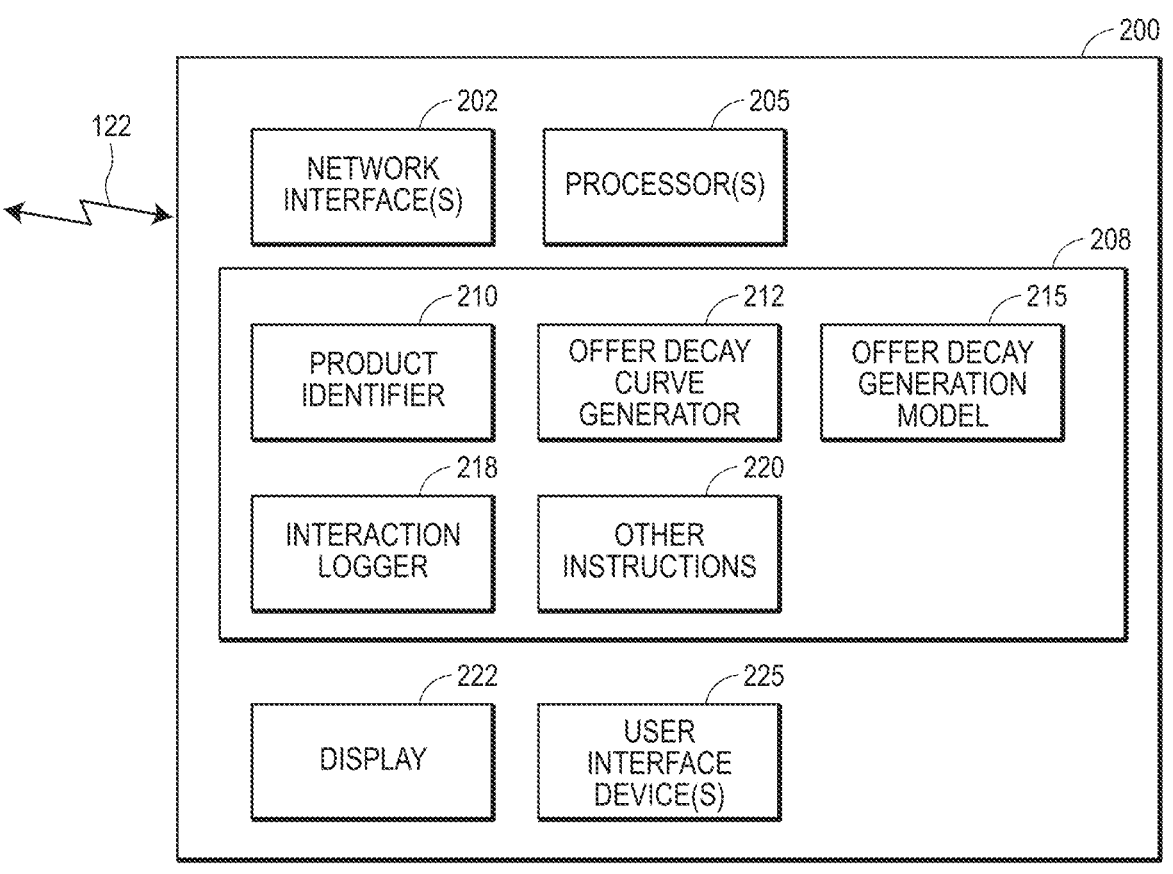
FIG. 2 depicts a block diagram of an example local computing device disposed at a physical storefront of the enterprise, which may be included in the system of FIG. 1.

FIG. 2 depicts a block diagram of an example local computing device 200 disposed at a physical storefront location of an enterprise, such as the computing device 105 disposed at the physical storefront 102 of FIG. 1. The local computing device 200 may be, for example, a desktop computing device or a portable computing device such as a tablet, laptop, smart device, or another type of handheld electronic device operated by an agent or associate of the enterprise or by a customer while the customer is at the physical storefront. For example, the computing device 200 may be a stationary or mobile point-of-sale computing device at which products may be scanned and purchased, an inventory management computing device, a pharmacy records management device, a rewards, loyalty account, or price-checking kiosk, a local store management computing device, etc. Generally speaking, the computing device 200 may be any physical computing device that is provided by the enterprise and that is utilized by agents of the enterprise and/or by customers at the physical storefront in which the computing device 200 is disposed. Although FIG. 2 depicts the local computing device 200 as being a single device and the computing device 200 is referred to herein using the singular tense, it is understood that the principles discussed herein with respect to the local computing device 200 may equally apply to a group or a local network of local computing devices 200 disposed at a physical storefront location.

As shown in FIG. 2, the example local computing device 200 may be communicatively connected to the back-end components 120 of the enterprise via one or more network interfaces 202, e.g., via the link(s) 122 and the one or more networks 125 as shown in FIG. 1. The local computing device 200 includes one or more processors 205 and one or more tangible, non-transitory memories 208 storing thereon various programs, applications, instructions, routines and data 210-220 which may be utilized in generating customized or personalized offer decay curves for individual customers or users of the enterprise, as well as in performing other tasks and operations of the enterprise. Generally speaking, the local programs, applications, instructions, routines and data 210-220 may operate in conjunction with one or more back-end components 120 to perform various tasks relating to customizing or personalizing offer decay curves for individual customers or users of the enterprise, e.g., by executing at least a portion of embodiments of any of the methods described herein, such as the method 300 and/or the method 400, as well as to perform other tasks relating to various other operations of the enterprise. The local computing device 200 may additionally include other components, such as a display 222 and one or more other user interface devices 225 such as a touchscreen, keyboard, mouse, microphone, scanner, camera, and/or other optical, auditory, and/or physical user interface devices.

As shown in FIG. 2, the one or more memories 208 of the local computing device 200 may store a product identifier module or component 210, an offer decay curve generator module or component 212, an offer decay generation model 215, an interaction logger module or component 218, and/or other modules, components, programs, applications, etc. 220, each of which comprises respective computer-executable instructions that are executable by the one or more processors 205. In embodiments, one or more of the product identifier module 210, the offer decay curve generation module 212, or the offer decay generation model 215 may be a respective instance of the product identifier module 138, the offer decay curve generator module 140, or the offer decay generation model 152 provided by the back-end components 120. It is noted that in some embodiments, one or more of the components 210, 212, 215, 218 may be omitted from the local computing device 200.

The interaction logger module or component 218 of the local computing device 200 disposed at the physical storefront location may be particularly configured to log or record interactions of customers with the enterprise as observed by the local computing device 200. In an example scenario, the interaction logger module or component 218 may record data indicative of an initial interaction of a customer with the enterprise at the physical storefront 102 of the enterprise (e.g., sensing the customer's arrival and/or opening the instance 108 of the enterprise application 145 at the physical storefront 102) and subsequent related customer interactions and respective time intervals elapsing therebetween, e.g., the customer moving to a particular region of the storefront 102, a length of customer dwell at the particular region, the customer scanning an item at a kiosk for a price check, an initial incentive value offered to the customer for a product, a subsequent (if any) incentive value offered to the customer, time intervals elapsing between the various customer interactions, and a result and/or outcome of the initial customer interaction and offered incentive(s). The data collected and logged by the interaction logger 218 may be transferred to the back-end servers 128 for storage as historical data 158 and/or to update customer user profile data 155, for example.

Although not shown, it is noted that in some embodiments of the ML system 100, respective instances of the interaction logger module 218 may also be included in and execute at the website 112, the browser 115 accessing the website 112, and/or the instances 108 of the client application 145 at user-operated PEDs 110 so that data indicative of user interactions with electronic storefronts may be recorded and transferred to be stored as historical data 158 and/or to update user profile data 155. For example, the interaction logger module or component 218 executing at an instance 108 of the client application 145 at a customer PED 110 may record data indicative of an initial interaction of the customer with the enterprise at the electronic storefront (e.g., opening the application instance 108), and subsequent related customer interactions and respective time intervals elapsing therebetween, e.g., the customer navigating to a particular region of the application instance 108, the customer entering search terms, the customer accessing detailed information about a product, the customer moving a product into an electronic shopping cart, an initial incentive value offered to the customer, a subsequent (if any) incentive value offered to the customer, time intervals elapsing between the various customer interactions, and a result and/or outcome of the initial customer interaction and offered incentive(s). The data collected and logged by the instances of the interaction logger 218 may be transferred to the back-end servers 128 for storage as historical data 158 and/or to update customer user profile data 155, for example.

Indeed, in some scenarios, the data collected by physical and electronic storefront interaction loggers 218 may be combined into a comprehensive interaction log of a customer over a specific time interval, such as when a customer physically shops within a physical storefront 102 of the enterprise and accesses the enterprise website 112 and/or the enterprise's application instance 108 via the customer's mobile device 110 while shopping at the physical storefront 102.

FIG. 3 depicts a flow chart of an example method 300 for generating an offer decay curve that is particularly personalized or customized for a particular user or customer of the enterprise, and that is related to a particular product provided by the enterprise. The method 300 may operate in conjunction with embodiments of at least a portion of the system 100 of FIG. 1 and any one or more components and/or devices related thereto (such as, for example, the network(s) 125, the PEDs 110, etc.), with embodiments of at least a portion of the local computing device 200 of FIG. 2, and/or with other systems, processors, databases and/or devices. For example, one or more of the back-end system components 120 and/or one or more components of the front-end system components 118 may execute an instance of the method 300, either individually or jointly. For ease of discussion, though, and not for limitation purposes, the method 300 is discussed with simultaneous reference to FIGS. 1 and 2. Further, the method 300 may include additional or alternate steps other than those described with respect to FIG. 3, in embodiments.

At a block 302, the method 300 may include obtaining, at one or more computing devices associated with an enterprise, an electronic signal indicative of an interaction of a customer with the enterprise. Generally speaking, the one or more computing devices associated via which the electronic signal is obtained may include the back-end computing devices 128 of the enterprise, one or more local computing devices 105, 200 associated with a physical storefront of the enterprise, and/or a personal electronic device 110 that is operated by a user or customer of the enterprise and on which an instance 108 of an enterprise client application 145 executes, and/or via which the customer accesses a website 112 of the enterprise via an executing browser 115. The electronic signal indicative of the customer interaction with the enterprise may be obtained via the network interface 130 or 202, for example.

Obtaining the electronic signal indicative of the interaction of the customer with the enterprise (block 302) may include detecting a presence of the customer at a physical storefront location, e.g., via one or more sensors and/or cameras disposed at the physical storefront and configured to detect the physical presence of the customer, via one or more electronic (e.g., wireless) transmissions generated by the PED 110 of the customer and detected by one or more local computing devices, transceivers, and/or sensors disposed at the physical storefront, via one or more local computing devices disposed at the physical storefront location and operated by an agent of the enterprise or by the customer (e.g., such as a point-of-sale register, a pharmacy records management device, a rewards account kiosk, and/or other embodiments of a local computing device 105, 200), and/or via other suitable detection means. Obtaining the electronic signal indicative of an interaction of the customer with the enterprise 302 may include obtaining an electronic signal that is indicative of a customer interaction with the website 112 or with the client application instance 108 corresponding to the enterprise, such as a navigation to the website 112, an opening or waking up of the application instance 108, a click, a swipe, another type of user control activation at the website 112 and/or the client application 108, a keyboard entry sequence, a navigation or selection action within the website 112 and/or the client application 108, etc.

Based on or in response to obtaining the electronic signal(s) indicative of the customer interaction(s) with the enterprise at the storefront location (block 302), the method 300 may include applying an offer decay generation model (e.g., the offer decay generation model 152, 215) to an indication of the customer to obtain an offer decay curve for an incentive on a product, where the offer decay curve is personalized or optimized specifically for the customer (block 305). That is, the set of decreasing values of the incentive and respective time intervals during which each value is valid are determined to maximize a probability that the customer will accept the offered incentive during the lifetime of the offer decay curve. In some embodiments, block 305 may include applying the offer decay generation model to one or more other parameters in conjunction with the application of the offer decay generation model to the indication of the customer, such as an indication of one or more of: the product, an inventory of the product, the storefront location from which the electronic signal indicative of the customer interaction was received, another storefront location corresponding to the customer, a day/date/time of the occurrence of the interaction, any related interactions and respective orderings and time intervals elapsing therebetween, an IP address of an electronic storefront location, the list price or advertised price of the product, an expected behavior of the customer, and the like. Generally speaking, the offer decay generation model may be implemented as one or more machine learning models trained on historical data (e.g., historical data 158) indicative of one or more interactions of the customer and/or other customers with the enterprise and products provided by the enterprise to determine offer decay curves configured to incentivize or motivate the customer to purchase products from the enterprise, such as in a manner described in more detail elsewhere within this disclosure.

In some embodiments (not shown in FIG. 3), the method 300 may include determining or identifying the product corresponding to the offer decay curve of the customer. Determining or identifying the product (block 305) may be based on one or more criteria, e.g., a single criteria, a group of criteria, a group of weighted or respectively prioritized criteria, etc. Examples of criteria based on which the product may be identified (block 305) may relate to the content and/or characteristics of the customer interaction, such as the region of a physical storefront in which the customer is located, dwell times of the customer at various regions of the physical or electronic storefront, a search for a particular product on the enterprise website by the customer, a product which has been left by the customer in the enterprise application shopping cart, previously purchased products and/or searches, suggested products, a scan of a price-checking kiosk within a physical storefront, etc. Additional or alternate examples of criteria based on which the product is identified (block 305) may relate to the enterprise as a whole and/or to the particular physical or electronic location of the storefront, such as promotions of products within the enterprise, promotions of products at the particular storefront location, products with a high priority of desired sell-through at the particular storefront location, inventory levels at or associated with the particular storefront location, etc. Still additional or alternate examples of criteria based on which the product is identified (block 305) may be based on products themselves and/or related timing constraints, such as products having impending expiration dates, impending dates by which the products will be removed from being available to be sold, products having higher profit margins, products having low levels of inventory, and the like. The criterion or criteria based on which the product is identified (block 305) and/or respective weights or priorities of the criteria may be specified a priori, e.g., manually by an agent of the enterprise and/or automatically based on one or more data analyses of historical enterprise data. The criterion or criteria based on which the product is identified (block 305) may be changed and/or tuned (e.g., by adjusting the weightings and/or priorities of the various criteria) as desired, either manually or automatically, for example.

Accordingly, in an embodiment, the method 300 may include, at some time prior to executing the block 305 (and not shown in FIG. 3), determining/identifying the product (e.g., based on the obtained electronic signal indicative of the customer interaction at block 302), and subsequently at the block 305 applying the offer decay generation model 152, 215 to an indication of the determined/identified product in conjunction with the indication of the customer to thereby obtain the offer decay curve that is personalized for the customer and that pertains to a changing incentive over time (e.g., an offer decay curve) which is optimized to motivate or incentivize the customer to purchase the determined/identified product. For example, the product identifier 138, 210 may identify the product, and the offer generator 140, 212 may apply a respective offer generation model 152, 215 to the indication of the identified product along with the indication of the customer.

Alternatively, in another embodiment of the method 300 (also not shown in FIG. 3), applying the offer decay generation model to the indication of the customer (block 305) may include automatically identifying one or more products and generating respective offer decay curves for each identified product, e.g., based on one or more parameters (and optionally, respective weights of the parameters) which have been input into the model 152, 215 in conjunction with the indication of the customer. That is, in this embodiment, an identification of the product is not included in the input parameters to the offer decay generation model, as the offer decay generation model is configured to automatically determine or identify candidate products and their respective optimal offer decay curves for the customer. As such, the offer generator 140, 212 of the system 100 may identify one or more candidate products and generate the respective offer decay curve for the candidate products, e.g., without utilizing a separate product identifier 138, 210. In these embodiments, the method 300 may include selecting one of the candidate products identified by the offer decay generation model and its respective offer decay curve for presentation to the customer. For example, the product and its offer decay curve may be selected based on a level of confidence, an inventory level, a corresponding profit margin and/or sell-through, an interaction of the customer, a date or time, and/or other criteria. In some implementations, multiple products and corresponding offer decay curve(s) may be selected to be presented to the customer.

The offer decay curve generated by and/or obtained from the offer decay generation model may be optimized for a customer to maximize a probability that the customer will accept the offered incentive corresponding to the product during the lifetime of the offer decay curve. Accordingly, the offer decay curve indicates an ordered set of decreasing values of the incentive over time, and a respective, mutually-exclusive, subsequent time interval for each value of the ordered set and during which each value is valid or available to the customer. The durations of the time intervals and/or the changing incentive value amounts are personalized and/or optimized for the customer and the product, so that the probability of the customer accepting the offered incentive at some point during the offer decay curve lifetime is maximized. Indeed, in some situations, an offer decay curve generated by the offer decay generation model may be unique to an individual customer. Accordingly, even though two customers may share some similar characteristics (e.g., demographics, favorite store locations, similar purchasing behaviors, etc.), the respective personalized offer decay curves generated by the offer decay generation model for a same product may differ between the two customers. For example, the durations of time intervals during which various incentive values are valid or available may be different for each of the two customers, and/or the decreases in the value of the offered incentive may be different for each of the two customers. In some situations, the incentives themselves may differ between the two customers who share common characteristics. For example, the different incentives may include differing discounts on a purchase price of the identified product, different free or discounted products with the purchase of the identified product, differing amounts of increases in respective rewards or loyalty accounts upon the purchase of the identified product, different offers of different and/or additional incentives which are to be awarded upon completion of a respective customer action or interaction (e.g., providing an email address, providing a review, posting on social media, answering a survey, etc.), and/or any other suitable incentives respectively designed to motivate each of the two customers to purchase a product and/or continue interacting with the enterprise.

At a block 308, the method 300 may include transmitting the offer decay curve to a computing device associated with the customer, e.g., for presentation or display thereon. For example, the offer decay curve may be transmitted to a customer's PED 110, to an in-store kiosk operated by the customer, to a device operated by an agent of the enterprise who is assisting the customer, etc. As such, the customer is informed or notified of the offer decay curve including the times and amounts at which the value of the incentive for the product will decrease. Thus, the offer decay curve is particularly configured to incentivize or motivate the customer to accept the offer and/or to purchase the specific product prior to the expiration of the offer, e.g., at any time during which a value of the incentive remains valid or available to the customer. In some embodiments, transmitting the offer to the computing device associated with the customer (block 310) may be based on the contents of the offer decay curve and/or a time at which the interaction of the customer with the enterprise occurred. For example, if the electronic signal indicative of the initial customer interaction is received or obtained during working hours (block 302), transmitting the offer decay curve to an instance 108 of the enterprise application 145 executing at the customer's PED 110 (block 308) may occur after the customer has left his or her office after work and has stopped by the physical enterprise location 102.

The method 300 may be executed by one or more back-end components 120, by one or more front-end components 118, or by a combination of one or more back-end components 120 and one or more front-end components. In a first example scenario, an entirety of the method 300 is performed by the back-end components 120 of the system 100, such as when the initial customer interaction is at the website 112. In a second example scenario, the local store computing device 105 obtains an indication of the presence of the customer at a physical location 102 (e.g., from one or more in-store sensors and/or wireless devices), and sends an indication of the customer's detected presence to the back-end computing components 120 of the system 100, and the back-end components 120 may perform the remainder of the method 300, e.g., by utilizing the offer decay curve generator module 140. In another example scenario, an entirety of the method 300 is performed by the local computing device 102, 200, and the interaction logger 218 at the local computing device 102, 200 transmits historical data indicative of the customer interaction, the incentive, the generated offer decay curve, and a resulting outcome to the back-end components 120 so that the historical data 158 and customer profile data 155 may be updated. Of course, other embodiments are possible.

FIG. 4 depicts a flow chart of an example method 400 for creating or generating an offer decay generation model, such as the offer decay generation model 152 of FIG. 1, and/or the offer decay generation model 215 of FIG. 2. The method 400 may operate in conjunction with embodiments of at least portions of the system 100 of FIG. 1 and any one or more components related thereto (such as the personal electronic devices 110, the network(s) 125, etc.), embodiments of at least portions of the local computing device 200 of FIG. 2, and/or other systems, processors, databases, and/or devices. For example, the model trainer 142 of the system 100 may perform at least a portion of the method 400. For ease of discussion herein, and not for limitation purposes, the method 400 is discussed with simultaneous reference to FIGS. 1 and 2. Additionally, in some embodiments, the method 400 may execute in conjunction with embodiments of the method 300 of FIG. 3. For example, the method 400 may execute prior to executing the method 300, e.g., to initially generate and train the offer decay generation model, and/or the method 400 may be executed after executing the method 300, e.g., to retrain or update the offer decay generation model. Further, the method 400 may include additional or alternate steps other than those described with respect to FIG. 4, in embodiments.

At a block 402, the method 400 includes obtaining historical data indicative of a plurality of interactions of a plurality of customers with an enterprise and a plurality of products provided by or offered for sale by the enterprise, including, for example, historical data indicative of incentives on various products which were offered to various customers (including incentive characteristics such as incentive types, values, times/dates the incentives were offered, expiration dates/times, etc.), whether or not customers accepted the offered incentives and purchased corresponding products (e.g., results or outcomes of the offered incentives), and time intervals elapsing between the incentive offers and the results/outcomes. For example, obtaining the historical data may include obtaining or accessing the historical data 158 stored in the data stores 150. Types of data included in the obtained historical data may include data indicative of or associated with customer interactions with the enterprise, for example, customer identities, customer characteristics (e.g., demographic, buying habits, etc.), types of interactions, locations of interactions, times/days/dates on which the interactions occurred, contents of interactions, product(s) associated with interactions, incentives which were offered to the customers and corresponding incentive characteristics, respective results or outcomes of the offered incentives (e.g., purchase, no purchase, saved item, purchase of another item, other interaction of customer with enterprise, etc.), time intervals elapsing between offered incentives and outcomes, and the like. Types of data included in the obtained historical data may additionally or alternatively include data indicative of products provided by the enterprise, for example, product identifiers, enterprise locations at which products were offered, product list prices, product sell-through prices, product profit margins, revenue generated from the sale of products, decays of inventories of products at various enterprise locations, changes in list prices of products over time, incentives that were offered and/or accepted with respect to certain products (and corresponding characteristics of the offered incentives), related products, times/days/dates corresponding to collected product data, maximum sell-through data and/or maximal revenue data of various enterprise locations for various conditions, such as dates, products, seasons, promotions, prices, etc. Types of data included in the obtained historical data may additionally or alternatively include data indicative of locations, such as products offered, inventories, decays of inventories over time, overall sell-through, overall generated revenue, overall profit margin, promotions and other incentives offered at the locations, times/days/dates corresponding to collected location data, etc. Of course, other types of historical data of the enterprise may be obtained.

In some implementations, obtaining the historical data (block 402) may include obtaining a subset of an entirety of the stored historical data 128. For example, an entirety of the historical data 128 stored in the back-end data store 150 of the ML system 100 may be filtered based on a particular customer, a particular location within the enterprise, a particular product or products, combinations thereof, etc.

At a block 405, the method 400 includes training an offer decay generation model (which may be implemented as one or more machine-learning models, for instance) on the obtained historical data to determine optimal offer decay curves of incentives on products, where the offer decay curves are optimized (e.g., for various types of customers, customers having certain combination of characteristics, and/or on a per-customer or individual customer basis) to have the highest probabilities (e.g., as compared to other offer decay curves) of motivating or incentivizing customers to purchase products, e.g., during the lifetimes of the offer decay curves. Generally speaking, at the block 405, one or more machine-learning techniques (e.g., clustering, regression, neural networks, etc.) may be applied to the obtained historical data to determine, for a given customer indicated in the obtained historical data, a personalized offer decay curve (including the incentive type, the set of decreasing incentive values, and respective time intervals between each value decrease) for the given customer for a specific product indicated in the obtained historical data. As such, the personalized offer decay curve may be configured to optimally incentivize or motivate the given customer to accept the offer and/or to purchase the specific product (e.g., as compared to other possible offer decay curves for the given customer), and optionally to achieve a target sell-through and/or target generated revenue for the specific product (and/or for one or more products related to the specific product), should the given customer accept the offer at some point along the offer decay curve.

Accordingly, the offer decay generation model may be trained to specifically customize, for each customer indicated in the historical data, offer decay curves for various products to maximize the probability of the customer accepting the offers within and/or purchasing the products, and/or to maximize the probability of achieving target sell-through levels and/or target generated revenues for products at enterprise locations. Further, in some implementations, the offer decay generation model may be trained to determine such customer-specific optimal offers based on one or more additional criteria or input parameters, such as enterprise location or locations; time of day, day of week, day of month or year; interactions of the customer which are related to the initial customer interaction; length of time elapsing since the initial customer interaction; length of time elapsing between two different customer interactions with a group of interactions of the customer with the enterprise; data indicative of offer decay curves of other incentives offered to other customers on other products; and the resulting behaviors of other customers indicated in the historical data; inventory levels of various products at various locations; inventory decays of various products at various locations; etc. Training the model (block 405) may include tuning and/or determining respective weights of various input parameters of the offer decay generation model, for example.

Creating and/or training the offer decay generation model (block 405) may include utilizing supervised and/or unsupervised machine learning techniques. For example, to create an initial offer decay generation model, supervised machine learning techniques may be applied to a training data set that has been pre-populated with data corresponding to different types of customers (e.g., customers with varying characteristics such as demographics, buying habits, etc.), products, incentives, and offer decay curves. Experimentation may be performed to determine more optimal offer decay curves of incentives for the different types of customers, where the more optimized offer decay curves are configured to provide a higher probability of customers accepting the offers (and optionally to also provide higher sell-through and/or generated revenue for various products as compared to other offer decay curves), should the offers be accepted prior to the respective offer expirations. For example, the application of the supervised learning techniques to the training data set may determine, for different types of customers indicated in the training data set, the types of incentives of the offers and corresponding offer decay curves that are more optimal (e.g., with respect to motivating the different types of customers to accept the offers and/or purchase products and/or with respect to sell-through and/or generated revenue for products indicated in the training data set at enterprise locations indicated in the training data set,) as compared to other possible offers.

The initially-generated offer decay generation model may be subsequently trained (e.g., in a supervised and/or non-supervised manner) on additional data which has been logged or collected and is indicative of actual customer interactions with the enterprise at physical and/or electronic storefronts. For example, interaction loggers 218 disposed at local enterprise computing devices 105, at browsers 115 and/or instances 108 of client applications 145 executing at customer PEDs 110, and/or at the website 112 may collect and store customer interaction data of a plurality of customers, offered incentives and respective offer decay curves (if any), and respective results or outcomes (e.g., as additional historical data 158). The initially-generated offer generated model may be re-trained on the updated historical data set 158 to generate an updated offer decay generation model. Thus, as the updated historical data set 158 includes data indicative of the transactions of a plurality of customers, the updated offer decay generation model may be trained to determine optimized offer decay curves for each customer of the plurality of customers indicated in the updated historical data set, e.g., for various products at various enterprise locations.

At a block 408, the method 400 includes storing the trained offer decay generation model at one or more back-end computing devices of the enterprise. For example, the trained offer decay generation model 152 may be stored within the back-end components 120 of the ML system 100, e.g., within a data store 150.

At an optional block 410, the method 400 includes transmitting respective instances of the trained offer decay generation model to one or more front-end computing devices and/or applications of the enterprise. For example, instances of the trained offer decay generation model 145 may be transmitted (e.g., pushed and/or pulled) to each of a number of local computing devices 105, 200 associated with respective physical storefront locations 102 for local storage and access. In some implementations, instances of the trained offer decay generation model 145 may be transmitted (e.g., pushed and/or pulled) to each of a number of instances 108 of the enterprise application 145 for local access at user PEDs 110. For example, a specific local computing device 200 at a specific physical location 200 may store an instance 215 of the trained offer decay generation model 152, and various components or modules at the local computing device 200 (such as the offer decay curve generator 212) may access the offer decay generation model 215 as needed.

In some arrangements, the block 410 may be omitted for one or more local computing devices 105 and/or one or more instances 108 of the enterprise application 145. For example, rather than locally storing an instance of the trained offer decay generation model 152, a local computing device 105 and/or an instance 108 of the enterprise application 145 executing at a user PED 110 may remotely access the offer decay generation model 152 stored at the back-end components 120, e.g., via the network(s) 125 as/when needed. For example, the offer decay curve generator 212 at the local computing device 200 may remotely access the offer decay generation model 152 to determine an optimized offer for a particular customer who has been detected as being within the enterprise location at which the local computing device 200 is disposed.

Thus, in view of the above, the novel systems, methods, and techniques disclosed herein are able to provide benefits and advantages that are not able to be provided by known techniques. In particular, the novel systems, methods, and techniques disclosed herein may provide the ability to generate individually customizable offer decay curves for products provided by the enterprise, where a particular offer decay curve is specifically configured (e.g., in both value decay and intermediate time intervals in between decreasing values) to maximize a probability of the particular offer incentivizing or motivating a particular customer to accept the particular offer, purchase a particular product or a related product, and/or otherwise interact with enterprise. Additionally or alternatively, the particular offer decay curve may be specifically configured to maximize a sell-through and/or generated revenue at the location, should the particular customer accept the offer. In some cases, an offer decay curve may be unique to a particular customer and product, and may not be transferred to or utilized by another customer. Indeed, if the particular customer transfers or gives the offer to another customer, the probability of the other customer accepting the offer and/or the probability that the sell-through and/or revenue at the location will be maximized should the offer be accepted may decrease, as the offer is not particularly customized for the other customer.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

Further, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method, comprising: obtaining, at one or more computing devices associated with an enterprise, an electronic signal indicative of an interaction of a customer with the enterprise;

based on the interaction of the customer with the enterprise, applying an offer decay generation model to an indication of the customer to obtain an offer decay curve for an incentive corresponding to a product provided by the enterprise, the offer decay curve optimized for the customer, the offer decay generation model being a machine learning model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize probabilities of the individual customers purchasing products; and the offer decay curve indicating an ordered set of decreasing values of the incentive, each value of the ordered set of decreasing values corresponding a respective subsequent time interval during which the each value is valid; and transmitting the offer decay curve to a computing device associated with the customer.

2. The method of the preceding aspect, wherein the product is a first product, and the incentive includes at least one of: a discount on a purchase price of the first product; a free or discounted second product with a purchase of the first product; an increase in a rewards account of the customer with the enterprise upon the purchase of the first product; or an offer of an additional incentive when another interaction of the customer is completed.

3. The method of any one of the preceding aspects, wherein applying the offer decay generation model to obtain the offer decay curve that is optimized for the customer comprises applying the offer decay generation model to obtain an offer decay curve that is unique to the customer.

4. The method of any one of the preceding aspects, wherein: the method further comprises determining, based on the obtained electronic signal, a location of the enterprise corresponding to the interaction of the customer; the historical data on which the offer decay generation model is trained includes historical data indicative of a plurality of locations of the enterprise; applying the offer decay generation model to the indication of the customer includes applying the offer decay generation model to an indication of the location in conjunction with the indication of the customer; and the offer decay curve is optimized for the customer and the location of the enterprise corresponding to the interaction of the customer.

5. The method of the preceding aspect, wherein the location of the enterprise corresponding to the customer is one of a physical location or an electronic location.

6. The method of any one of the preceding aspects, wherein the product is determined based on the interaction of the customer with the enterprise.

7. The method of the preceding aspect, wherein applying the offer generation model to obtain the offer decay curve for the incentive corresponding to the product includes applying the offer generation model to determine the product and to obtain the offer decay curve for the incentive corresponding to the product.

8. The method of any one of the preceding aspects, wherein the historical data on which the offer decay generation model is trained includes historical data indicative of respective durations of time elapsing between different incentive values included in an offered set of related incentive values, and a respective outcome of the offered set.

9. The method of any one of the preceding aspects, wherein: the historical data on which the offer decay generation model is trained further includes historical data indicative of respective inventories of the plurality of products provided by the enterprise; applying the offer decay generation model to the indication of the customer includes applying the offer decay generation model to an indication of a current inventory of the product in conjunction with the indication of the customer; and the offer decay curve is optimized for the customer and the current inventory of the product.

10. The method of any one of the preceding aspects, further comprising determining a length of time during which the customer is expected to remain at a location of the enterprise at which the interaction of the customer with the enterprise occurred; and wherein a last incentive value of the ordered set expires prior to an elapsing of the length of time during which the customer is expected to remain at the location of the enterprise.

11. The method of the preceding aspect, further comprising determining the length of time during which the customer is expected to remain at the location based on historical data indicative of one or more interactions of the customer with the enterprise.

12. The method of any one of the preceding aspects, wherein a last incentive value of the ordered set of the decreasing incentive values expires at or prior to a pre-determined time or date.

13. The method of any one of the preceding aspects, wherein: the one or more computing devices associated with the enterprise include a back-end server system communicatively connected to one or more computing devices disposed at a plurality of locations of the enterprise; the back-end server system trains the offer decay generation model based on the historical data; and the method further comprises transmitting the trained offer decay generation model to at least one of the one or more computing devices disposed at the plurality of locations of the enterprise.

14. The method of the preceding aspect, wherein the back-end server system trains the offer decay generation model by utilizing at least one of supervised machine learning techniques or unsupervised machine learning techniques.

15. The method of any one of the preceding aspects, wherein the customer is a first customer included in the plurality of customers, the incentive is a first incentive, the product is a first product, the offer decay curve is a first offer decay curve, and the method further comprises: applying the offer decay generation model to an indication of a second customer included in the plurality of customers, thereby obtaining a second offer decay curve for a second incentive corresponding to the first product or to a second product, the second offer decay curve optimized for the second customer, and the second offer decay curve being different than the first offer decay curve; and transmitting the second offer to a computing device associated with the second customer.

16. The method of any one of the preceding aspects, wherein the first customer and the second customer share a set of demographic characteristics.

17. A system, comprising:
a network interface via which an electronic signal indicative of an interaction of a customer with an enterprise is received;
an offer decay generation model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize probabilities of the individual customers purchasing products; and
an offer decay curve generator component configured to apply the offer decay generation model to an indication of the customer to generate an offer decay curve optimized for the customer, the offer decay curve indicating an ordered set of decreasing values of an incentive corresponding to a product provided by the enterprise, and each value of the ordered set of decreasing values corresponding to a respective subsequent time interval during which the each value is valid.

18. The system of aspect 17, wherein the product is a first product, and the incentive includes at least one of: a discount on a purchase price of the first product; a free or discounted second product with a purchase of the first product; an increase in a rewards account of the customer with the enterprise upon the purchase of the first product; or an offer of an additional incentive when another interaction of the customer is completed.

19. The system of any one of aspects 17-18, wherein the customer is included in the plurality of customers, and the offer decay curve is unique to the customer.

20. The system of any one of aspects 17-19, wherein the system is further configured to transmit, via the network interface, the offer decay curve to a computing device associated with the customer for presentation to the customer.

21. The system of any one of aspects 17-20, wherein: a location of the enterprise corresponding to the interaction of the customer is determined based on the received electronic signal; the historical data based on which the offer decay generation model is trained includes historical data indicative of a plurality of locations of the enterprise; the offer decay curve generator component is configured to apply the offer decay generation model to an indication of the location in conjunction with the indication of the customer; and the offer decay curve is optimized for the customer and the location of the enterprise corresponding to the interaction of the customer.

22. The system of the preceding aspect, wherein the location of the enterprise corresponding to the customer is a physical location or an electronic location.

23. The system of any one of aspects 17-22, wherein the historical data on which the offer decay generation model is trained includes historical data indicative of respective durations of time elapsing between one or more sets of related incentive values, and a respective outcome of each set.

24. The system of any one of aspects 17-23, further comprising a product identifier component configured to determine the product based on the received electronic signal, and wherein the offer decay curve generator component is configured to apply the offer decay generation model to an indication of the product in conjunction with the indication of the customer.

25. The system of any one of aspects 17-24, wherein: the historical data on which the offer decay generation model is trained further includes historical data indicative of respective inventories of the plurality of products provided by the enterprise; the offer decay curve generator component is configured to apply the offer decay generation model to an indication of a current inventory of the product in conjunction with the indication of the customer; and the offer decay curve is optimized for the customer and the current inventory of the product.

26. The system of any one of aspects 17-25, wherein a last incentive value of the ordered set expires at or prior to at least one of: an elapsing of the length of time during which the customer is expected to remain at a location of the enterprise from which the electronic signal was received, or a pre-determined time or date.

27. The system of any one of aspects 17-26, wherein: the system includes a back-end server system communicatively connected to one or more remote computing devices disposed at one or more locations of the enterprise; and the back-end server system includes one or more data storage devices storing the historical data and a model training component configured to train the offer decay generation model on the historical data.

28. The system of the preceding aspect, wherein: the back-end server system is configured to transmit the trained offer decay generation model to a least one of the one or more remote computing devices disposed at the one or more enterprise locations; and the at least one of the one or more remote computing devices store the trained offer decay generation model received from the back-end server system for use by respective offer decay curve generator components.

29. The system of any one of aspects 27-28, wherein the model training component trains the offer decay generation model by utilizing supervised machine learning techniques.

30. The system of any one of aspects 27-29, wherein the model training component trains the offer decay generation model by utilizing unsupervised machine learning techniques.

31. The system of any one of aspects 27-30, wherein: the customer is a first customer, the product is a first product, the incentive is a first incentive, and the offer decay curve is a first offer decay curve; the back-end server system is configured to update the historical data stored in the one or more data storage devices to include data indicative of the interaction of the first customer with the enterprise, the first offer decay curve, and a response to the first incentive corresponding to the first offer decay curve; the model training component is configured to retrain the offer decay generation model based on the updated historical data; and the offer decay curve generator component is further configured to apply the retrained offer decay generation model to an indication of a second customer to obtain a second offer decay curve for a second incentive corresponding to the first product or to a second product, the second offer decay curve optimized for the second customer.

32. The system of any one of aspects 17-31, wherein: the customer is a first customer included in the plurality of customers, the incentive is a first incentive, and the offer decay curve is a first offer decay curve; and the offer decay curve generator component is further configured to apply the offer decay generation model to an indication of a second customer included in the plurality of customers, thereby generating a second offer decay curve for a second incentive corresponding to the first product or a second product, the second offer decay curve optimized for the second customer, and the second offer decay curve being different than the first offer decay curve.

33. The system of the preceding aspect, wherein the first customer and the second customer share a set of demographic characteristics.

34. Any one of the preceding aspects in combination with any other one of the preceding aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method, comprising:

obtaining, at one or more computing devices associated with an enterprise, an electronic signal indicative of an interaction of a customer with the enterprise;

based on the interaction of the customer with the enterprise, applying an offer decay generation model to an indication of the customer to identify a plurality of candidate products corresponding to the customer, and generate a respective offer decay curve for a respective incentive corresponding to each candidate product included in the plurality of candidate products, the respective offer decay curves optimized for the customer, the offer decay generation model being a machine learning model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize probabilities of the individual customers purchasing products, and the respective offer decay curve indicating a respective ordered set of decreasing values of the respective incentive, each value of the respective ordered set of decreasing values corresponding to a respective subsequent time interval during which the each value is valid;

selecting, from among the plurality of candidate products, a particular product; and transmitting an indication of the selected particular product and the respective offer decay curve corresponding to the selected particular product to a computing device associated with the customer.

2. The method of claim 1, wherein at least one of:

the respective offer decay curves are unique to the customer; or the respective incentive corresponding to the each candidate product includes at least one of:

a discount on a purchase price of the each candidate product;

a free or discounted product with a purchase of the each candidate product;

an increase in a rewards account of the customer with the enterprise upon the purchase of the each candidate product; or an offer of an additional incentive when another interaction of the customer is completed.

3. The method of claim 1, wherein:

the method further comprises determining, based on the obtained electronic signal, a location of the enterprise corresponding to the interaction of the customer, the location being a physical location or an electronic location;

the historical data on which the offer decay generation model is trained includes historical data indicative of a plurality of locations of the enterprise;

applying the offer decay generation model to the indication of the customer includes applying the offer decay generation model to an indication of the location in conjunction with the indication of the customer; and the respective offer decay curves are optimized for the customer and the location of the enterprise corresponding to the interaction of the customer.

4. The method of claim 1, wherein:

the historical data on which the offer decay generation model is trained further includes historical data indicative of respective inventories of the plurality of products provided by the enterprise;

applying the offer decay generation model to the indication of the customer includes applying the offer decay generation model to an indication of a current inventory of products in conjunction with the indication of the customer; and the respective offer decay curves are optimized for the customer and the current inventory of products.

5. The method of claim 1, further comprising determining, based on historical data indicative of one or more interactions of the customer with the enterprise, a length of time during which the customer is expected to remain at a location of the enterprise at which the interaction of the customer with the enterprise occurred, the location of the enterprise being a physical location or an electronic location; and wherein a last incentive value of the respective ordered set expires prior to an elapsing of the length of time during which the customer is expected to remain at the location of the enterprise.

6. The method of claim 1, wherein a last incentive value of the respective ordered set of the decreasing values expires at or prior to a pre-determined time or date.

7. The method of claim 1, wherein:

the one or more computing devices associated with the enterprise include a back-end server system communicatively connected to one or more computing devices disposed at a plurality of locations of the enterprise;

the back-end server system trains the offer decay generation model based on the historical data; and the method further comprises transmitting the trained offer decay generation model to at least one of the one or more computing devices disposed at the plurality of locations of the enterprise.

8. The method of claim 7, wherein the back-end server system trains the offer decay generation model by utilizing at least one of supervised machine learning techniques or unsupervised machine learning techniques.

9. The method of claim 1, wherein the customer is a first customer included in the plurality of customers, the respective offer decay curves are first respective offer decay curves, the respective incentives are first respective incentives, the plurality of candidate products is a first plurality of candidate products, and the method further comprises:

applying the offer decay generation model to an indication of a second customer included in the plurality of customers to thereby generate a second respective offer decay curve for a second respective incentive corresponding to each candidate product included in a second plurality of candidate products, the second respective offer decay curves optimized for the second customer, and the second respective offer decay curves being different than the first respective offer decay curves; and transmitting an indication of a second particular product of the second plurality of candidate products and the respective offer decay curve corresponding to the second particular product to a computing device associated with the second customer.

10. The method of claim 9, wherein the first customer and the second customer share a set of demographic characteristics.

11. A system, comprising:

a set of back-end components of an enterprise, the set of back-end components including:

a network interface communicatively connecting the set of back-end components with a set of front-end components of the enterprise and via which an electronic signal transmitted by the set of front-end components and indicative of an interaction of a customer with the enterprise is received;

an offer decay generation model stored on one or more data stores, the offer decay generation model trained on historical data indicative of a plurality of interactions of a plurality of customers with the enterprise, a plurality of products provided by the enterprise, a plurality of offered incentives associated with the plurality of products, and a plurality of outcomes of the plurality of offered incentives to determine offer decay curves that are specific to individual customers and that are configured to maximize probabilities of the individual customers purchasing products; and an offer decay curve generator component including computer-executable instructions that are stored on one or more tangible memories that, when executed by one or more processors, cause the system to input, to the offer decay generation model, an indication of the customer indicated by the electronic signal and obtain a corresponding output of the offer decay generation model, the corresponding output including a plurality of offer decay curves that respectively correspond to a plurality of candidate products provided by the enterprise and corresponding to the customer, the plurality of offer decay curves being optimized for the customer, each offer decay curve of the plurality of offer decay curves indicating a respective ordered set of decreasing values of a respective incentive corresponding to a respective candidate product, and each value of the respective ordered set of decreasing values corresponding to a respective subsequent time interval during which the each value is valid.

12. The system of claim 11, wherein the respective candidate product is a first candidate product, and the incentive includes at least one of:

a discount on a purchase price of the first candidate product;

a free or discounted product with a purchase of the first candidate product;

an increase in a rewards account of the customer with the enterprise upon the purchase of the first candidate product; or an offer of an additional incentive when another interaction of the customer is completed.

13. The system of claim 11, wherein at least one of: the customer is included in the plurality of customers, or the plurality of offer decay curves is unique to the customer.

14. The system of claim 11, wherein system is further configured to identify the plurality of candidate products based on the interaction of the customer with the enterprise.

15. The system of claim 11, wherein the system is further configured to transmit, via the network interface, at least one of the plurality of offer decay curves to a computing device associated with the customer for presentation to the customer.

16. The system of claim 11, wherein the historical data on which the offer decay generation model is trained includes historical data indicative of respective durations of time elapsing between one or more sets of related incentive values, and a respective outcome of each set.

17. The system of claim 11, wherein:

a location of the enterprise corresponding to the interaction of the customer is determined based on the received electronic signal, the location being one of a physical location or an electronic location;

the historical data based on which the offer decay generation model is trained includes historical data indicative of a plurality of locations of the enterprise;

the offer decay curve generator component is configured to input, to the offer decay generation model, an indication of the location in conjunction with the indication of the customer; and the plurality of offer decay curves is optimized for the customer and the location of the enterprise corresponding to the interaction of the customer.

18. The system of claim 11, wherein:

the historical data on which the offer decay generation model is trained further includes historical data indicative of respective inventories of the plurality of products provided by the enterprise;

the offer decay curve generator component is configured to input, to the offer decay generation model, an indication of a current inventory of products in conjunction with the indication of the customer; and the plurality of offer decay curves is optimized for the customer and the current inventory of products.

19. The system of claim 11, wherein a last incentive value of the respective ordered set expires at or prior to at least one of: an elapsing of a length of time during which the customer is expected to remain at a location of the enterprise from which the electronic signal was received, or a pre-determined time or date.

20. The system of claim 11, wherein:

the system includes a back-end server system communicatively connected to one or more remote computing devices disposed at one or more locations of the enterprise;

the back-end server system is included in the set of back-end components of the enterprise, and the one or more remote computing devices are included in the set of front-end components of the enterprise;

the back-end server system includes one or more data storage devices storing the historical data and a model training component configured to train the offer decay generation model on the historical data;

the back-end server system is configured to transmit the trained offer decay generation model to a least one of the one or more remote computing devices disposed at the one or more enterprise locations; and the at least one of the one or more remote computing devices store the trained offer decay generation model received from the back-end server system for use by respective offer decay curve generator components.

* * * * *